(12) United States Patent
Richter et al.

(10) Patent No.: US 8,955,291 B2
(45) Date of Patent: Feb. 17, 2015

(54) PACKAGING MACHINE WITH OSCILLATING SEALING TOOL

(75) Inventors: Tobias Richter, Memmingen (DE); Elmar Ehrmann, Bad Grönenbach (DE); Guido Spix, Ulm (DE)

(73) Assignee: Multivac Sepp Haggenmuller GmbH & Co. KG, Wolfertschwenden (DE)

( * ) Notice: Subject to any disclaimer, the term of this patent is extended or adjusted under 35 U.S.C. 154(b) by 636 days.

(21) Appl. No.: 13/093,288

(22) Filed: Apr. 25, 2011

(65) Prior Publication Data

US 2011/0258966 A1     Oct. 27, 2011

(30) Foreign Application Priority Data

Apr. 26, 2010 (DE) .......................... 10 2010 018 288

(51) Int. Cl.
*B65B 51/14*     (2006.01)
(52) U.S. Cl.
USPC ............. 53/329.2; 53/463; 53/477; 53/373.7; 53/375.9; 53/376.6; 53/377.7
(58) Field of Classification Search
USPC ............... 53/427, 463, 477, 510, 111 R, 329, 53/329.2, 370.7, 373.7, 375.9, 376.6, 53/377.7
See application file for complete search history.

(56) References Cited

U.S. PATENT DOCUMENTS

| 3,022,814 | A |   | 2/1962  | Bodine, Jr. |
| 3,254,402 | A |   | 6/1966  | Balamuth et al. |
| 3,787,257 | A | * | 1/1974  | Akerlund ...................... 156/73.1 |
| 3,912,576 | A | * | 10/1975 | Braun ......................... 156/580.2 |
| 3,956,975 | A | * | 5/1976  | Egleston et al. .............. 493/135 |
| 4,554,034 | A | * | 11/1985 | Ensminger ....................... 156/69 |
| 4,767,492 | A | * | 8/1988  | Fukusima et al. .......... 156/580.2 |
| 6,802,920 | B2| * | 10/2004 | Shinohara et al. ........... 156/73.1 |
| 2010/0024360 | A1 |   | 2/2010 | Ehrmann et al. |
| 2010/0319305 | A1 | * | 12/2010 | Guo ................................ 53/512 |

FOREIGN PATENT DOCUMENTS

| DE | 1 479 511 A1 | 7/1969 |
| DE | 102005017570 A1 | 10/2006 |
| DE | 10 2008 035 994 A1 | 2/2010 |
| FR | 2416781 A1 | 9/1979 |

OTHER PUBLICATIONS

German Search Report Dated Feb. 14, 2011, Application No. 10 2010 018 288.5-27, Applicant Multivac Sepp Haggenmueller GmbH & Co. KG, 3 Pages.

* cited by examiner

*Primary Examiner* — Christopher Harmon
(74) *Attorney, Agent, or Firm* — Husch Blackwell LLP

(57) ABSTRACT

The invention relates to a packaging machine with a sealing device, whereby a sealing-tool upper part or sealing-tool lower part can be excited to a vibration (S) approximately parallel to a sealing plane (E).

17 Claims, 3 Drawing Sheets

PACKAGING MACHINE WITH OSCILLATING SEALING TOOL

CROSS-REFERENCE TO RELATED APPLICATIONS

This application claims foreign priority benefits under 35 U.S.C. §119(a)-(d) to German patent application number DE 102010018288.5, filed Apr. 26, 2010, which is incorporated by reference in its entirety.

TECHNICAL FIELD

The invention relates to a packaging machine with a sealing device.

BACKGROUND

Contamination of a plastic bag or plastic packaging by the filling material is difficult to prevent in many packaging processes, particularly in the packaging of foodstuffs. Most problems occur primarily with packaging processes which do not include automated process steps during the filling of the packaging material with the filling material. Process steps of this nature can be seen to a large extent with chamber machines or belted chamber machines. Packaging materials used with this type of machine are normally plastic bags. Here, filling is carried out by operating personnel who must take the greatest care not to contaminate the sealing-weld surfaces. Furthermore, it must be considered that a high processing rate also needs to be achieved with the packaging of foodstuffs. Firstly, this is due to economic aspects and secondly, particularly with the packaging of foodstuffs, also due to the perishable nature of the product.

Another reason, which renders the prevention of contamination difficult, is the shape of the packaging material. Whereas with packaging machines for plastic trays an automatic filling process is technically easily implemented, the filling of plastic bags for sealing in chamber machines is difficult to automate. Also the risk that the sealing-weld surface is contaminated by the filling material, is higher with bags than with trays, whether this is with manual or automatic filling. Since the product to be packaged comes very close to the sealing-weld surface or must pass by it due to the shape of the bag, contamination of this surface is difficult to prevent. In addition the sealing-weld surfaces can be better protected by specially adapted cover devices when filling trays.

The main problem which occurs through the wetting of the sealing-weld surface by different types of material is that the ensuing sealing seam does not exhibit the desired strength of sealing or has leaks. If large product residues are present in the sealing-weld region, the molecular movements in the plastic melt during the sealing process are impeded.

The effect of product residues in the sealing weld can be explained principally based on a peel system. Due to the inclusions of product residues in the sealing weld, the seal layers are not joined together over the whole surface. Depending on the number and size of these inclusions, reduced strength of the sealing weld occurs, through to leakage. The weld has a tendency to tear open between the sealing layer and the product residues. In contrast to the peel system this is not desired here.

Not all products which are packaged present a problem for sealing and for the strength of the sealing weld. There are also unproblematic types of contamination which do not negatively affect the sealing process. Experience with this problem has shown that amongst other factors the consistency or viscosity of the filling material is decisive. The thinner the filling material, the fewer problems occur with the sealing process, because during sealing the filling material can be forced out of the fusing region by the applied sealing pressure. Strongly adhesive contaminants, highly viscous products and powder-type filling material more often cause problems when closing the package with a sealing weld. Also the composition of the filling material is relevant.

For example, meat juice very much impairs the sealing process. Since meat juice is mostly of low viscosity, it should be possible to easily force it out of the sealing zone. However, if the structure of meat and therefore also meat juice is considered, then it is found that it mainly consists of proteins. If a large number of these proteins are present in the sealing layer during the sealing process, then the macromolecules of the sealing process of the packaging material cannot form sufficient linkages. Due to the different structure of the proteins and the macromolecules of the melt, there is no or only weak bonding capability present and therefore it has a very negative effect on the strength of the sealing weld.

With contamination due to very small particles which do not wet the sealing zone over the complete area, the result can be improved by a wider sealing weld. With pronounced contamination over large areas of the sealing weld this measure usually brings no improvement. Sealing profiles are known which force the contamination out of the sealing region. They present an expedient solution. With oval, triangular or half-round profiles attempts are made to remove unwanted residues from the joining zone during sealing.

Similarly, the state of the art is to use ultrasound techniques for sealing. With ultrasonic sealing any contaminants in the sealing weld are forced out of the sealing-weld region by the vibrations occurring during sealing. In this respect the direction of movement is carried out orthogonal to the sealing plane. Ultrasound is employed today in sealing tools of flow pack machines, butt-ended bagging machines as well as for closing cups and tubes. In the field of evacuated packages or packages with modified atmospheres the use of ultrasound techniques is very complex and expensive.

SUMMARY

An object of the present disclosure is to make a packaging machine available with which the disadvantages described above can be remedied.

A packaging machine according to the present disclosure, preferably a deep-draw packaging machine, tray-sealing machine or chamber or belted-chamber machine, contains a sealing device for sealing plastic films such as bags, trays or deep-drawn containers, wherein the sealing device has a sealing-tool upper part and a sealing-tool lower part. With chamber machines the sealing-tool upper part and the sealing-tool lower part are implemented as bars. Here, at least the sealing-tool upper part or the sealing-tool lower part is implemented oscillating in a plane located approximately parallel to the sealing surface or sealing weld. This plane is preferably orthogonal to the closing movement and direction of force for clamping two layers of film which are to be welded together.

Through a relative movement of the sealing-tool upper part to the sealing-tool lower part or to the two film layers, product residues, which are located in the region of the sealing weld to be produced, are forced out or, in combination with heat, enclosed in the sealing weld. This leads to a sealed and closed package and to a higher strength of the sealing weld.

Furthermore, the polymers of the film layers are viscoelastic. The viscosity of the melt is reduced through shear stressing of the macromolecules due to vibrational excitation. With lower viscosity, chains of molecules can move past foreign particles in the melt to enclose them and thus to form a sufficiently strong bond with the molecules of the other sealing layer.

The vibrational excitation thus supports the thermal sealing process. The sealing process is supported through the additional introduction of frictional energy. Due to the reduction of the viscosity during shear stressing, it can be assumed that the molecules of the melt mix and cross-link even at low temperatures. Thus, the sealing temperature can be reduced in dependence of the sealing pressure, sealing time and film properties and the energy efficiency of the packaging machine thereby increased.

As the vibrational excitation finishes the melt viscosity increases rapidly due to the removal of the shear stress irrespective of the temperature. This establishes the strength of the sealing weld substantially faster than is possible through cooling the sealing tools and thus facilitates a shorter fixing time of the films by the sealing tools.

Advantageously, the direction of vibration is linear or circular. Linear vibration is preferred for the sealing bars of chamber machines. The circular vibration is particularly advantageous with sealing tools of deep-draw packaging machines and tray-sealing machines, because here closed, usually rectangular sealing welds are produced, and directional components are present for all regions of the sealing weld due to the circular motion to obtain a shear stress and to force product residues out of the region of the sealing weld or to be able to increase mixing.

For the packaging machine according to the present disclosure, oscillation frequencies in the range from 5 Hz to 500 Hz and a range for the oscillation amplitude from 0.1 mm to 1.0 mm are preferably to be provided. The frequency range from 10 Hz to 50 Hz is particularly advantageous. This facilitates the use of standard material for the bags, films or trays.

In this connection the product of the frequency and the amplitude in a range from 4 mm/s to 12 mm/s is particularly suitable.

In the packaging machine according to the present disclosure it is possible to manufacture packages by sealing under a vacuum or modified atmosphere. This is a basic requirement for use in the field of foodstuffs packaging.

The vibration of at least one part of the sealing tool in the packaging machine according to the present disclosure can be implemented through mechanical excitation. As well as a motorised drive with a cam disc, piezo-actuators or moving coils can be used. The present disclosure is not restricted to these generators and others are conceivable which are suitable for the oscillation frequency and amplitude ranges mentioned above.

In the following an advantageous embodiment of the present disclosure is presented in more detail based on a drawing.

BRIEF DESCRIPTION OF THE DRAWINGS

In the figures identical components are designated with the same reference numerals throughout.

DETAILED DESCRIPTION

Figure 1:
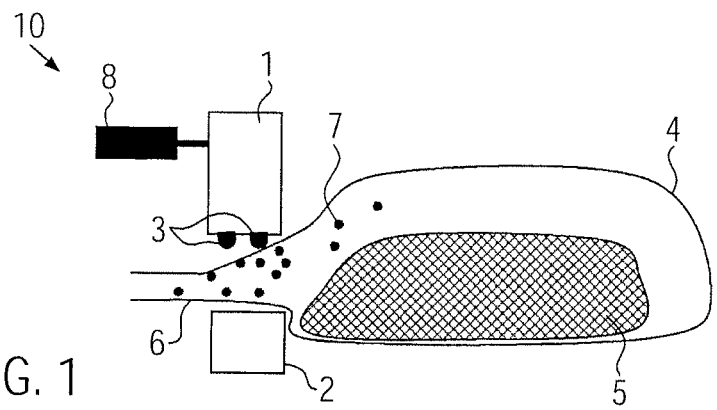
FIG. 1 illustrates a schematic side elevation of a sealing device with sealing bars of a packaging machine according to the present disclosure in an open position.

FIG. 1 illustrates in a schematic side elevation the sealing device 10 of a chamber machine or belted chamber machine with an upper sealing bar 1 and a lower sealing bar 2. On the upper sealing bar 1 two sealing wires 3 are arranged in the shape of a double-round profile. A bag 4 of a plastic film is filled with a product 5, whereby product residues 7, e.g. meat juice, blood, sauce or powder, are located in the region of the neck 6 of the bag. The neck 6 of the bag is placed between the sealing bars 1, 2 and the cover of the chamber machine, which is not illustrated, is closed. The interior of the chamber is evacuated to minimise the oxygen content in the bag 4.

Figure 2:
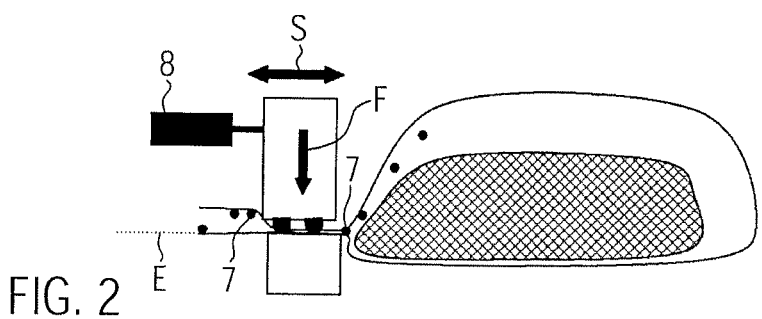
FIG. 2 illustrates a schematic side elevation of a sealing device as in FIG. 1 during the sealing process.

Then the upper sealing bar 1 executes a movement towards the lower sealing bar 2, as illustrated in FIG. 2. In doing so, the upper sealing bar 1 with the sealing wires 3 produces a force F on both sides of the neck 6 of the bag with respect to the lower sealing bar 2.

In doing this, product residues 7 partially in the region of the surfaces to be sealed or of the sealing weld 9 are enclosed.

Figure 3:
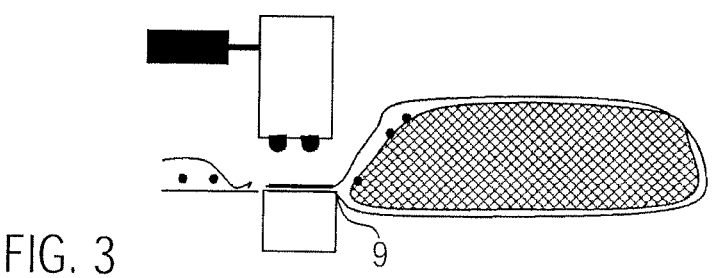
FIG. 3 illustrates a schematic side elevation of a sealing device as in FIG. 2 in the reopened position.

By means of a vibrational exciter 8 fitted on the upper sealing bar 1, the upper sealing bar 1 executes an oscillating movement S transverse to the sealing weld 9. A sealing plane E is defined by the sealing surface in which the neck 6 of the bag is pressed against the lower sealing bar 2 by the upper sealing bar 1. The vibration S takes place in a plane parallel to the plane E. The time for the vibrational excitation can be entered into a controller, which is not illustrated, by the operator and stored in a recipe store for later recall. Product residues 7 located at the edge of the sealing region are forced out of the sealing region on both sides in the direction of the neck 6 of the bag and the product 5. Product residues 7, which are located further in the sealing region, are displaced by the shearing movement of the upper sealing bar 1 such that the two film sides of the bag 4 fuse together around the product residues 7 such that a sealed package is produced, the sealing weld 9 of which exhibits the strength of the sealing weld required for the relevant use, as illustrated in FIG. 3. The shearing movement finishes after the fusing of the films or of the neck 6 of the bag. Thereafter, clamping ceases in that the upper sealing bar 1 is moved back into the top position.

Figure 7:
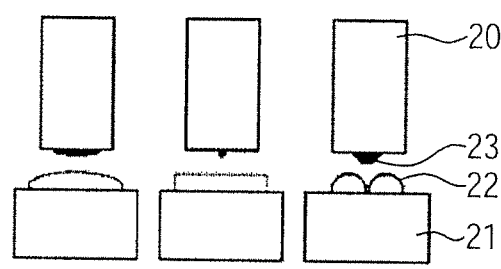
FIG. 7 illustrates various embodiments of sealing-tool upper and lower parts in combination.

With the embodiment of a sealing device 10 described above, it is also possible that the lower sealing bar 2 or both sealing bars 1, 2 implement the shearing movement by means of one or more vibrational exciters 8. The embodiment of the contours of both sealing bars 1, 2 is not restricted to the illustration shown. Further possible variants are illustrated in FIG. 7 or are known from the state of the art.

Figure 4:
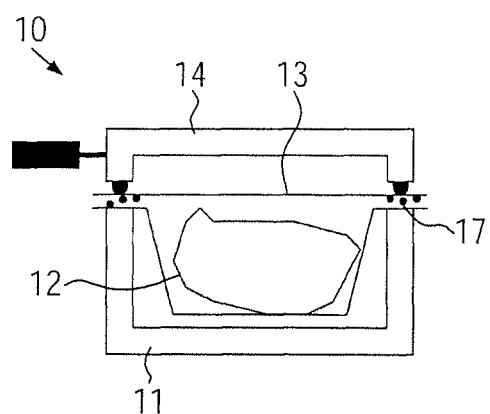
FIG. 4 illustrates a schematic side elevation of a sealing device for packages with a closed sealing weld of a packaging machine according to the present disclosure in an open position.

In FIG. 4 another variant of the packaging machine according to the present disclosure with a sealing device 10 is illustrated in a schematic side elevation as it is typically used for closed sealing welds in tray sealing machines or deep-draw packaging machines. A sealing-tool lower part 11 accepts the tray 12 or the deep-drawn package lower part 12 and a lid film 13 is added. A seal 15 is fitted to a tool upper part 14. Here different contours are conceivable which are adapted depending on the use, e.g. film properties.

Figure 5:
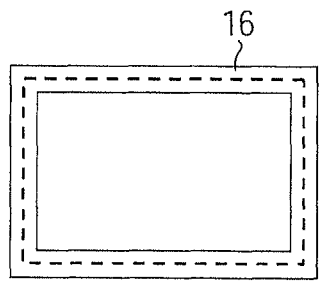
FIG. 5 illustrates a schematic plan view of a sealing device as in FIG. 4.

In FIG. 5 a sealing weld 16 can be seen in a closed form as a plan view on the tool lower part 11.

Figure 6:
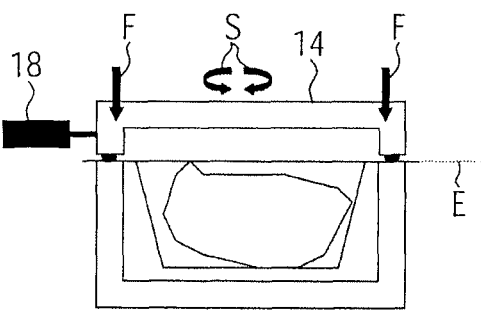
FIG. 6 illustrates a schematic side elevation of a sealing device for packages with a closed sealing weld of a packaging machine according to the present disclosure during the sealing process.

In the ensuing process, the sealing-tool upper part 14 is moved downwards onto the sealing-tool lower part 11. In doing so, a force F is produced, thereby pressing the lid film 13 onto the tray 12. The product residues 17 in the region of the sealing weld 16 are in part enclosed, as shown in FIG. 6. A vibrational exciter 18 fitted to the tool upper part 14 produces a vibration S and a shearing movement in a plane parallel to the sealing plane E, which is defined by the sealing weld. The vibration S is circular-shaped and thus has directional components, which exhibit a shearing movement transverse to the run of the sealing weld for each direction of the sealing weld 16 in the plan view. Further variants are conceivable, such as superimposed vibrations S created by one or more vibrational exciters 18, which in each case only execute a linear vibration S, for example orthogonal to one another.

FIG. 7 shows three variants of combinations of sealing-tool upper parts 20 and sealing-tool lower parts 21. The packaging machine according to the present disclosure with a sealing device is not restricted to these illustrated variants. In contrast other combinations are also conceivable, which are created by transposition, e.g. from top and bottom or sideways, of the individual contours 22, 23.

The contours can have special characteristics, such as a round, oval, cuboid, triangular, polygonal, or trapezoidal shape or a multiple arrangement of the same or similar shapes. The combination can be adapted to the type of product residues and the film properties, such as the surface and thickness.

Here, it does not matter whether one or both contours are heated to fuse the films 12, 13 together.

The vibration can also start with the clamping process of the films and force product residues out of the sealing region even before the thermal input for welding the films starts.

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A packaging machine comprising a sealing device for welding plastic films, the sealing device having a sealing-tool upper part and a sealing-tool lower part that produce a sealing surface defining a sealing plane by welding the plastic films, wherein one of the sealing-tool upper part and the sealing-tool lower part is selectively heatable to a desired temperature, and wherein at least the sealing-tool upper part or the sealing-tool lower part is excitable to a vibration in a plane approximately parallel to the sealing surface, and wherein the vibration is at a frequency in a range from 5 Hz to 500 Hz for one of forcing out at least some of a product residue in the sealing surface, and reducing the viscosity of a melted portion of the plastic films at the sealing surface through vibrational excitation, and wherein one of the sealing-tool upper part and the sealing-tool lower part is selectively heated to heat-weld the plastic films simultaneously with at least the sealing-tool upper part or the sealing-tool lower part being vibrated.

2. The packaging machine according to claim 1 wherein the vibration is executed in a circular manner.

3. The packaging machine according to claim 1 wherein the vibration is executed linearly.

4. The packaging machine according to claim 1 wherein the vibration can be generated at a frequency from 10 Hz to 500 Hz.

5. The packaging machine according to claim 1 wherein the vibration has an amplitude from 0.1 mm to 1.0 mm.

6. The packaging machine according to claim 1 wherein the vibration has a frequency and an amplitude, and the product of the frequency and the amplitude is in a range from 4 to 12 mm/s.

7. The packaging machine according to claim 1 wherein the packaging machine is operable to close off a packaging produced from the plastic films under vacuum and/or modified atmosphere.

8. The packaging machine according to claim 1 wherein the vibration is mechanically excited.

9. The packaging machine according to claim 1 wherein one of the sealing-tool upper part and the sealing-tool lower part is selectively heated to a temperature below the melting temperature of the plastic films.

10. A packaging machine for sealing a package that receives a product, wherein the package comprises two plastic film portions, the packaging machine comprising:
   a sealing device for welding the plastic film portions, the sealing device having a sealing-tool upper part and a sealing-tool lower part that are configured to produce a sealing surface defining a sealing plane by heat welding the plastic film portions, wherein one of the sealing-tool upper part and lower part is selectively heatable to a desired temperature for said heat welding the plastic film portions at the sealing surface; and
   a vibrational exciter device associated with at least the sealing-tool upper part or the sealing-tool lower part and configured to excite at least the sealing-tool upper part or the sealing-tool lower part to a vibration in a plane approximately parallel to the sealing surface, wherein the said vibrational exciter device is configured to generate the vibration at a frequency from 5 Hz to 500 Hz for one of forcing out at least some of a product residue in the sealing surface, and reducing the viscosity of a melted portion of the plastic films at the sealing surface through vibrational excitation; and
   wherein the one of the sealing-tool upper part and lower part is selectively heated to a temperature below the melting temperature of the plastic film to seal the two plastic film portions while said vibrational exciter device is operating.

11. The packaging machine according to claim 10 wherein the vibrational exciter device executes the vibration in a circular manner.

12. The packaging machine according to claim 10 wherein the vibrational exciter device executes the vibration linearly.

13. The packaging machine according to claim 10 wherein the vibrational exciter device is configured to generate the vibration at a frequency from 10 Hz to 500 Hz.

14. The packaging machine according to claim 10 wherein the vibrational exciter device is configured to generate the vibration such that the vibration has an amplitude from 0.1 mm to 1.0 mm.

15. The packaging machine according to claim 10 wherein the vibrational exciter device is configured to generate the vibration such that the vibration has a frequency and an amplitude, and such that the product of the frequency and the amplitude is in a range from 4 to 12 mm/s.

16. The packaging machine according to claim 10 wherein the packaging machine is operable to seal the package under vacuum and/or modified atmosphere.

17. The packaging machine according to claim 10 wherein the vibrational exciter device mechanically excites the vibration.

* * * * *